United States Patent

Harara et al.

[11] Patent Number: 5,472,225
[45] Date of Patent: Dec. 5, 1995

[54] MOUNTING FOR SUSPENSION ARM CONTROL ACTUATOR

[75] Inventors: Mitsuhiko Harara; Yoshiki Miichi; Tadao Tanaka, all of Okazaki; Takahiro Yanagi, Nagoya; Hiroyuki Masuda, Okazaki, all of Japan

[73] Assignee: Mitsubishi Jidosha Kogyo Kabushiki Kaisha, Tokyo, Japan

[21] Appl. No.: 261,093

[22] Filed: Jun. 16, 1994

[30] Foreign Application Priority Data

Jun. 16, 1993 [JP] Japan ................................. 5-144668

[51] Int. Cl.⁶ ............................. B62D 17/00; B60G 7/02
[52] U.S. Cl. ...................... 280/661; 280/663; 280/673; 280/690; 280/691
[58] Field of Search ...................... 280/661, 675, 280/673, 663, 666, 668, 670, 660, 690, 691, 696, 701

[56] References Cited

U.S. PATENT DOCUMENTS

| | | | |
|---|---|---|---|
| 4,580,807 | 4/1986 | Cox et al. ........................... | 280/661 |
| 4,796,720 | 1/1989 | Bauer ................................. | 280/661 |
| 4,840,396 | 6/1989 | Kubo ................................. | 280/690 |
| 5,292,149 | 3/1994 | Luger ................................ | 280/661 |

FOREIGN PATENT DOCUMENTS

| | | | |
|---|---|---|---|
| 0067111 | 4/1984 | Japan ................................. | 280/668 |
| 0092981 | 5/1985 | Japan ................................. | 280/661 |
| 0131307 | 7/1985 | Japan ................................. | 280/673 |
| 0044308 | 2/1989 | Japan ................................. | 280/673 |
| 3248963 | 11/1991 | Japan ................................. | 280/661 |
| 5221219 | 8/1993 | Japan . | |
| 5221218 | 8/1993 | Japan . | |

*Primary Examiner*—Mitchell J. Hill
*Assistant Examiner*—Peter C. English

[57] ABSTRACT

In an actuator structure of a vehicle suspension apparatus, an operation rod of an actuator is swingably connected to a vehicle body side end of a lower suspension arm through a rubber bushing, the operation rod is contained in a body and is slidable in a longitudinal direction of the lower suspension arm, and the body is mounted on a vehicle body through a rubber mount, thereby improving durability, environmental resistance, and mounting workability of the actuator structure.

15 Claims, 6 Drawing Sheets

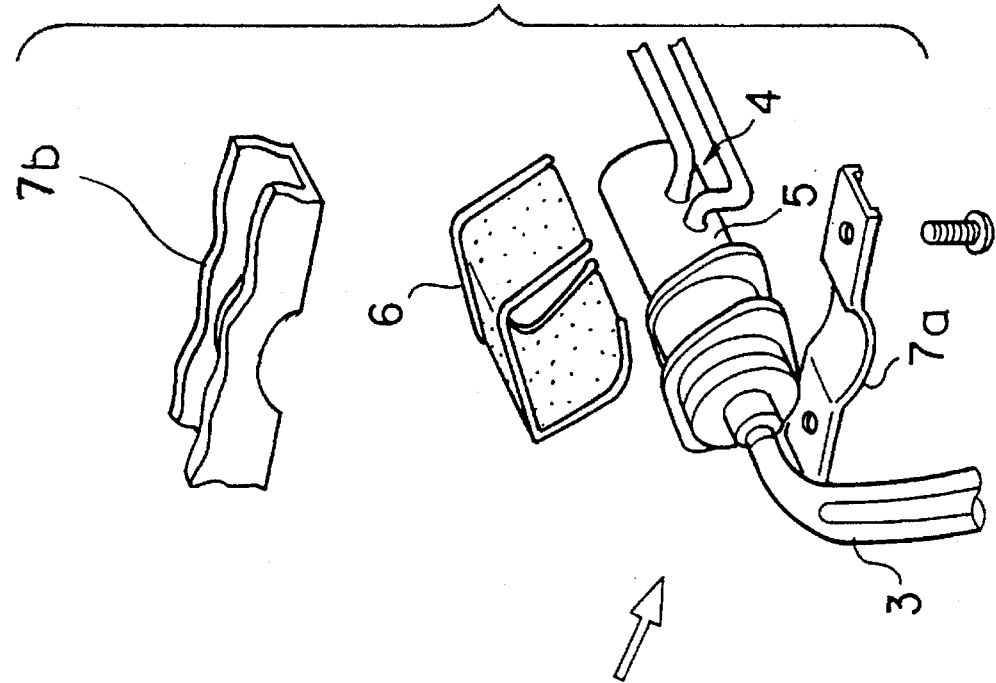
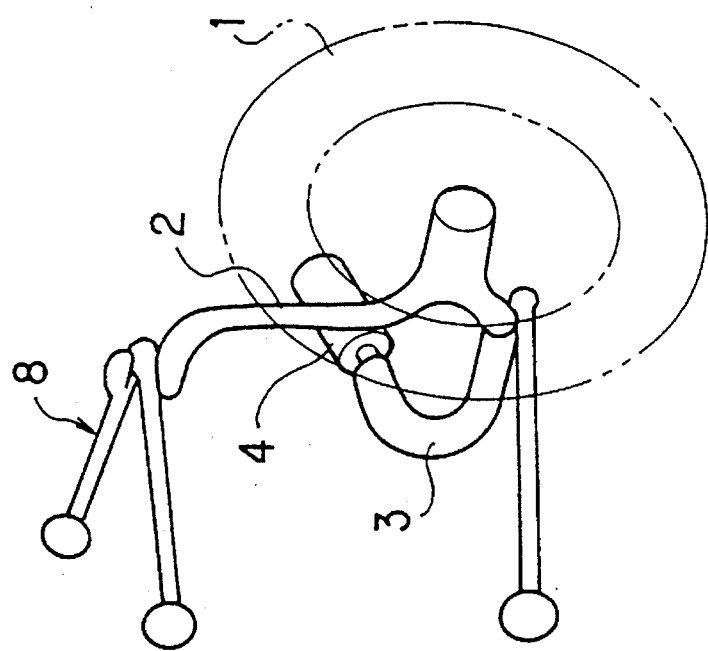
FIG. 4(a)
FIG. 4(b)

5,472,225

MOUNTING FOR SUSPENSION ARM CONTROL ACTUATOR

BACKGROUND OF THE INVENTION

This invention relates to an actuator structure of a suspension apparatus for a vehicle.

Heretofore, to vary the alignment in a suspension apparatus for a vehicle such as a caster angle, a camber angle, and a toe-in angle, there has been known an alignment apparatus comprising an actuator mounted on a suspension arm or the like for varying the arm length and the mounting position of the suspension arm on the vehicle body, and a controller or the like for controlling the actuator.

With such an arrangement, when the controller drives the actuator, relative positions of the arm, strut, and the like constructing the suspension apparatus are varied, and the alignment is varied.

For example, in general, when the vehicle is turning, since the vehicle body tends to roll, the ground camber angle of the outer wheel in relation to the turning direction increases in the positive direction and the ground camber angle of the inner wheel in relation to the turning direction increases in the negative direction. In such a case, in a vehicle provided with the above alignment apparatus, the controller detects turning of the vehicle to control the actuator, the ground camber angle of the outer wheel increasing in the positive direction and the ground camber angle of the inner wheel increasing in the negative direction are decreased to improve contact of the individual wheels with the ground, thereby improving the turning stability and the turning limit of the vehicle. Further, when the vehicle is running straight, the caster angle and the like is controlled to improve the straight running stability of the vehicle.

As an actuator in such an alignment apparatus, there has been known, for example, one of which is shown in FIG. 6, wherein a hydraulic cylinder 05 of a suspension arm 04 is disposed between a knuckle 02, for rotatably supporting a rear wheel 01, and a sub-frame 03 of a vehicle body.

However, in the above prior art actuator for alignment control, since the actuator is disposed in the intermediate portion of the suspension arm 04, due to movement of the suspension, the actuator is applied with a high load in directions other than the expansion/contraction direction of the actuator or generates a resonance phenomenon, and the actuator is required to have a high durability and tends to be large in size.

Further, since the length of the suspension arms 04 is controlled, a curvature differs between a expanded condition and a contracted condition, and thus a geometrical change due to suspension stroke is not constant.

OBJECT AND SUMMARY OF THE INVENTION

A primary object of the present invention is to provide an alignment control actuator of a suspension apparatus which is compact and having improved mounting workability while having sufficient durability and environmental resistance.

In accordance with the present invention, there is provided an alignment control actuator of a suspension apparatus comprising an operation rod having at an end thereof a connection unit for swingably connecting a vehicle body side end of a suspension arm, an actuator body for slidably containing the operation rod, and a first elastic member mounted on an outer periphery of the actuator body for elastically connecting a vehicle body member with the actuator body.

Preferably, the operation rod has a piston, and the actuator body has a cylinder unit divided by the piston into two hydraulic chambers. In this case, it is more preferable that the actuator body has a hollow-structured arm support unit at a suspension arm side of the cylinder unit, the connection unit is supported in a hollow portion of the arm support unit to be slidable in a longitudinal direction of the suspension arm. Further preferably, the arm support unit has an inner diameter greater than that of the cylinder unit.

Further, it is preferable that the first elastic member is disposed at a position corresponding to the connection unit which is located at a neutral position on the outer periphery of the actuator body, and the actuator body is connected to the vehicle body member only through the first elastic member. In this case, it is more preferable that the actuator body provided with the first elastic member has a non-circular cross section, the actuator body has on its outer periphery a pair of contact surfaces opposing each other substantially perpendicular to an axial line of the operation rod, the vehicle body member has a pair of contact surfaces opposing the pair of contact surfaces of the actuator body, the first elastic member has portions disposed individually between the pair of contact surfaces of the actuator body and the pair of contact surfaces of the vehicle body member.

The alignment control actuator of the present invention preferably further comprises a shaft having an axial line substantially parallel to the rotation axial line of the suspension arm, and a second elastic member rotatably supported on the shaft for elastically connecting an end of the suspension arm.

Another embodiment of the alignment control actuator of a suspension apparatus of the present invention comprises an operation rod having at an end thereof a connection unit for pivotably connecting a vehicle body side end of a suspension arm and a piston unit at the other end thereof, an actuator body having a cylinder unit divided by the piston unit into two hydraulic chambers, and a hollow-structured arm support unit disposed at a suspension arm side of the cylinder unit for slidably supporting the connection unit on an inner peripheral surface, for slidably supporting the operation rod, and a first elastic member mounted on an outer periphery of the actuator body on a periphery of the connection unit at a neutral position of alignment for connecting the vehicle body and the actuator body, wherein the actuator body is connected to a vehicle body member only through the first elastic member. In this case, the cylinder unit has on a peripheral wall thereof first and second ports individually communicating with the hydraulic chambers.

A further embodiment of the alignment control actuator of a suspension apparatus of the present invention, the suspension having a suspension lower arm connected at one end thereof to a knuckle, rotatably supporting vehicle wheels through a ball joint, for receiving a longitudinal force of a vehicle body inputted to the wheels, comprises an operation rod having a connection unit for pivotably connecting the other end of the suspension lower arm, an actuator body for slidably containing the operation rod, and a first elastic member mounted on the outer periphery of the actuator body for elastically connecting a vehicle body member and the actuator body.

The present invention has an advantage that since the actuator body and the vehicle body member are connected by the first elastic member mounted on the outer periphery of the actuator body, inputs other than in the expansion/ contraction direction of the actuator are received by the first elastic member, and the actuator itself is not required to have a high durability.

In particular, when the first elastic member is disposed on the periphery of the connection unit of the operation rod, and the suspension arm is in the neutral condition of the alignment, the actuator body is supported on the vehicle body member at a position closest to the input point of load inputted from the suspension, and the load is hardly applied to the actuator body. Further, since the connection unit of the suspension arm and the operation rod is slidably supported in the arm support unit of the actuator body, load is received by the connection unit, thereby preventing an unfavorable load such as prying from being applied to the piston unit. In particular, when the inner diameter of the arm support unit is greater than the inner diameter of the piston, a burden to the piston unit is further reduced.

Further, in the connection unit, since the suspension arm is connected by the shaft to be rotatable in the rotation direction, and also by the second elastic member to be pivotably in a direction different from the rotation direction, sliding resistance of the connection unit can be relatively reduced.

In addition, since the actuator body is connected to the vehicle body side only through the first elastic member disposed on the outer periphery of the arm support unit, the cylinder unit is not required to have a direct connection to the vehicle body member, and design flexibility can be enhanced when providing a supply port for supplying hydraulic oil to the cylinder unit. Further, even when the actuator body is connected to the vehicle body side only through the first elastic member, by providing a pair of flanges on the outer periphery of the actuator body and disposing the first elastic member between the flanges, the actuator itself can be prevented from dislocating in the expansion/contraction direction and, since the portion of the actuator body where the first elastic member is disposed has a non-circular shape, the actuator body can be simply prevented from rotation.

In short, the apparatus can be designed compact, and load input to the actuator can be efficiently reduced. Further, by reducing the unsprung weight (such as the weight of suspension arms and wheels), driving comfort can be improved, and since the suspension arm and the actuator can be integrated, the mounting workability is also improved. Further, design flexibility of the actuator itself is improved, and the above problem that the geometrical change due to suspension stroke is not constant can be eliminated.

BRIEF DESCRIPTION OF THE DRAWINGS

FIG. 4(a) is a schematic view for explaining mounting of the actuator of the present invention to a suspension apparatus;

FIG. 4(b) is an exploded view for explaining mounting of the actuator to a subframe;

DETAILED DESCRIPTION OF PREFERRED EMBODIMENTS

An embodiment of the present invention will be described in detail with reference to the accompanying drawings.

Figure 5:
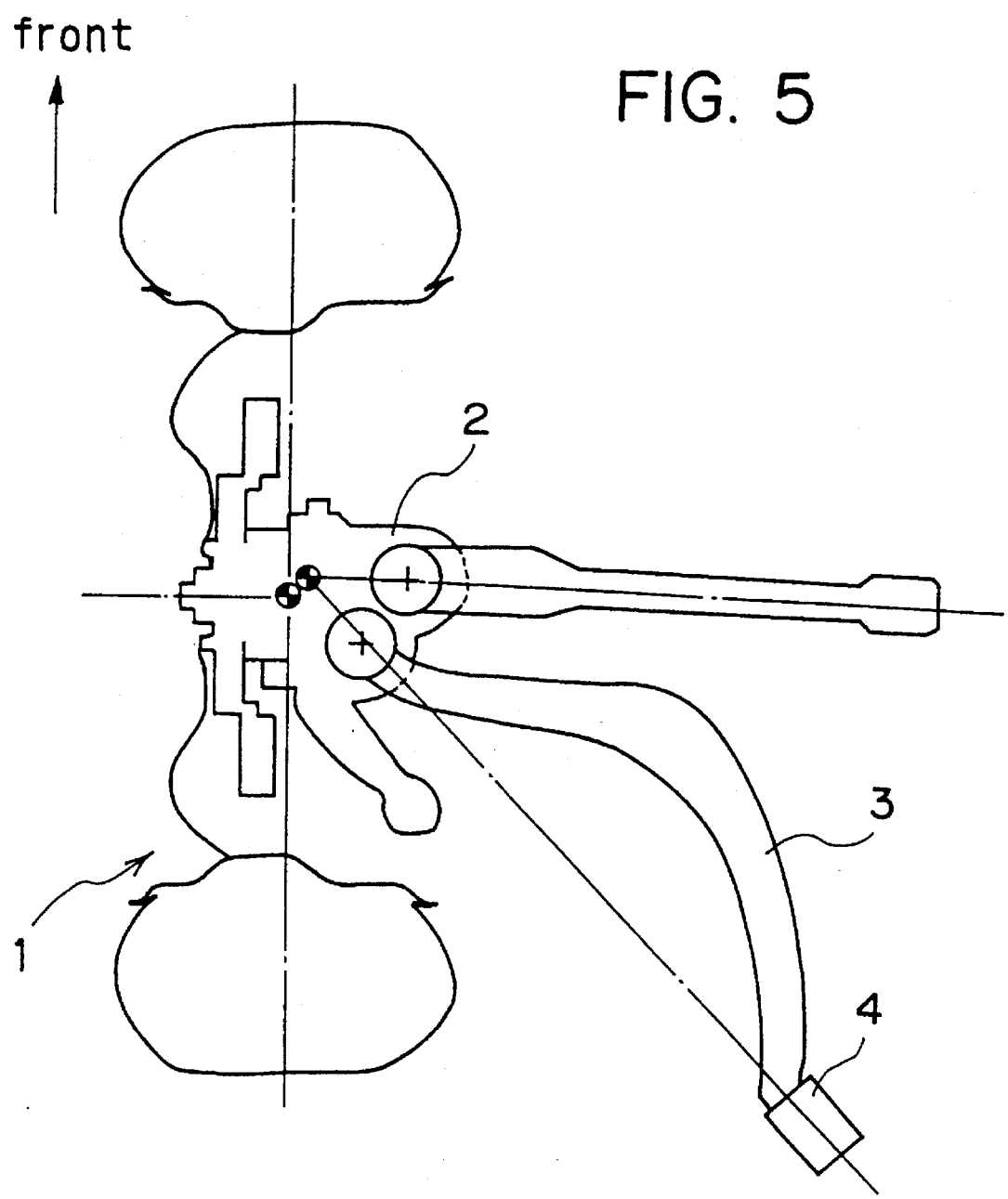
FIG. 5 is a schematic plan view showing layout of a lower arm of the suspension apparatus shown in FIG. 4.
Figure 6:
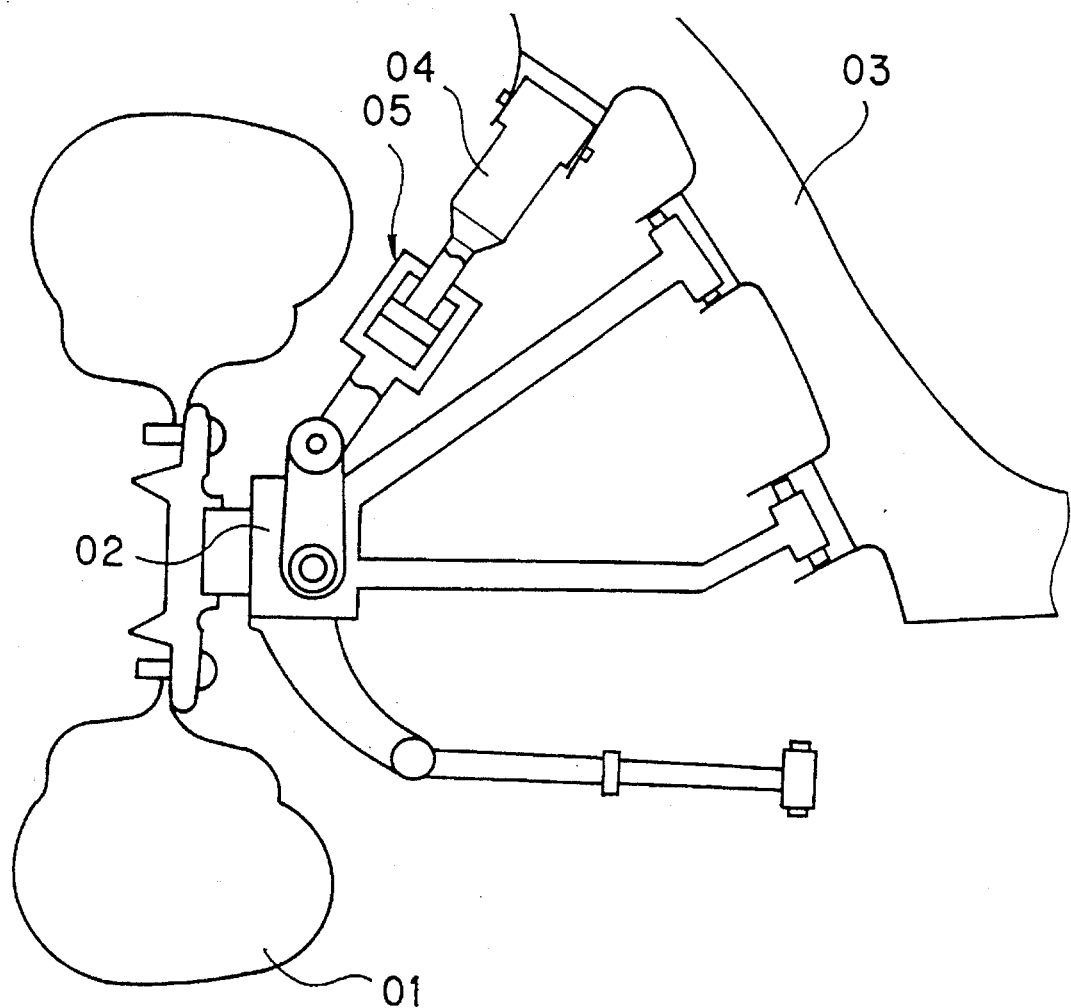
FIG. 6 is a schematic view showing a prior art apparatus.

As shown in FIGS. 4(a), 4(b) and 5 the actuator structure of the present invention is applied to a multi-link type front suspension, including two lower arms connecting the lower portion of a knuckle 2 for supporting a front wheel 1 to the vehicle body member side, an actuator 4 connected to the vehicle body side end of a compression lower arm 3, a body 5 of the actuator 4 linked through a rubber mounts 6 to a sub-frame 7b of the vehicle body member with a bracket 7a and bolts. As shown in FIG. 5, the compression lower arm 3 and the lower portion of the knuckle 2 are connected through a ball joint, and the other lower arm is similarly connected to the lower portion of the knuckle 2 through a ball joint. The vehicle body member side mounting point of the lower arm is connected to the vehicle body member through a rubber bushing having a rotary axial line in a nearly longitudinal direction.

Therefore, alignment control in the present embodiment is to control a caster angle by moving the vehicle body member side mounting point of the compression lower arm 3. In FIG. 4(a), the reference numeral 8 indicates a pair of upper arms connecting an extension part, extending from the upper portion of the knuckle 2, to the vehicle body side. The pair of upper arms are connected to the extension part of the knuckle 2 through a ball joint, and to the vehicle body member through a rubber bushing having a rotary axial line in a nearly longitudinal direction.

Figure 1:
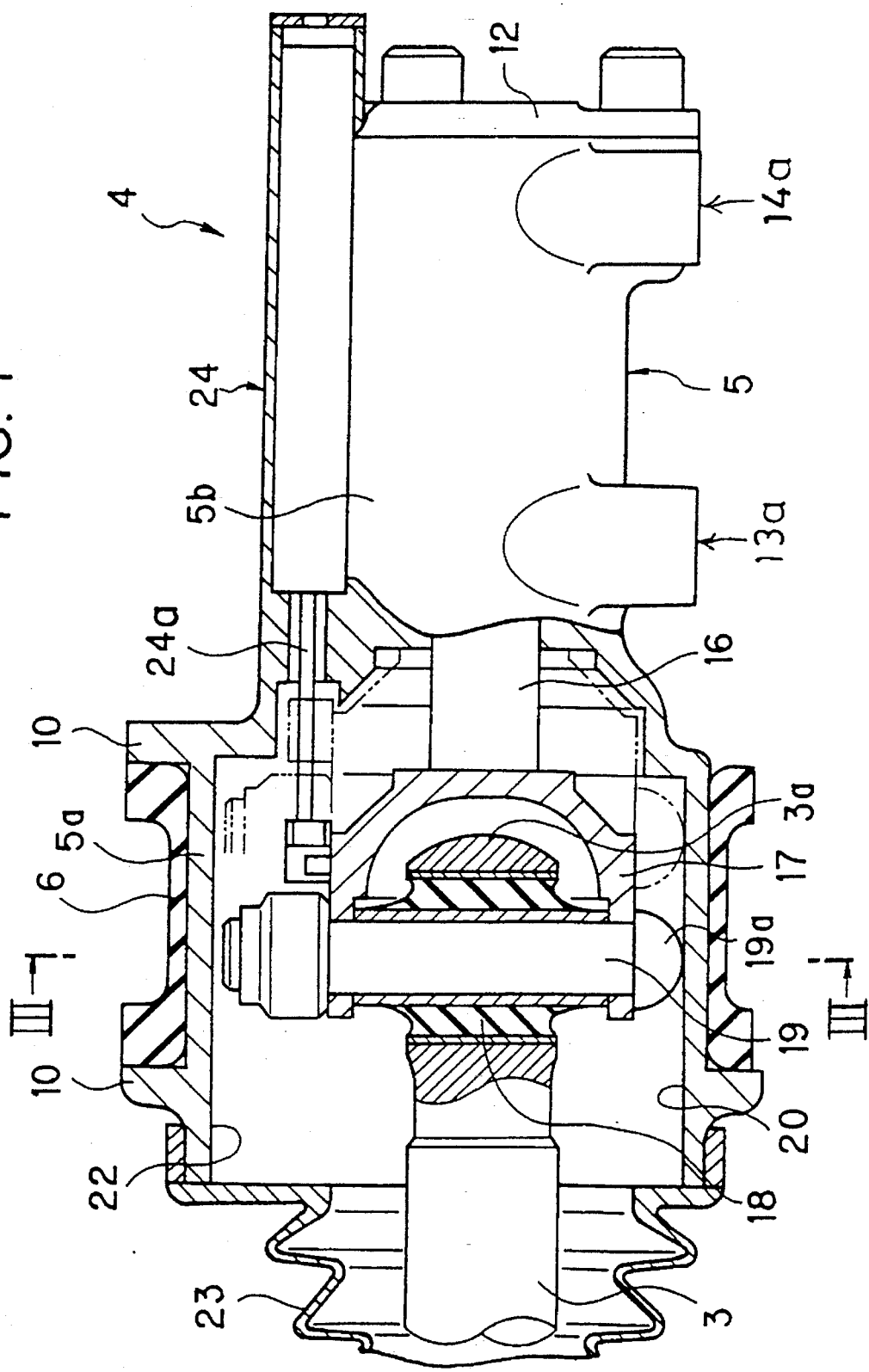
FIG. 1 is a partly cutaway schematic plan view showing an embodiment of the present invention.
Figure 2:
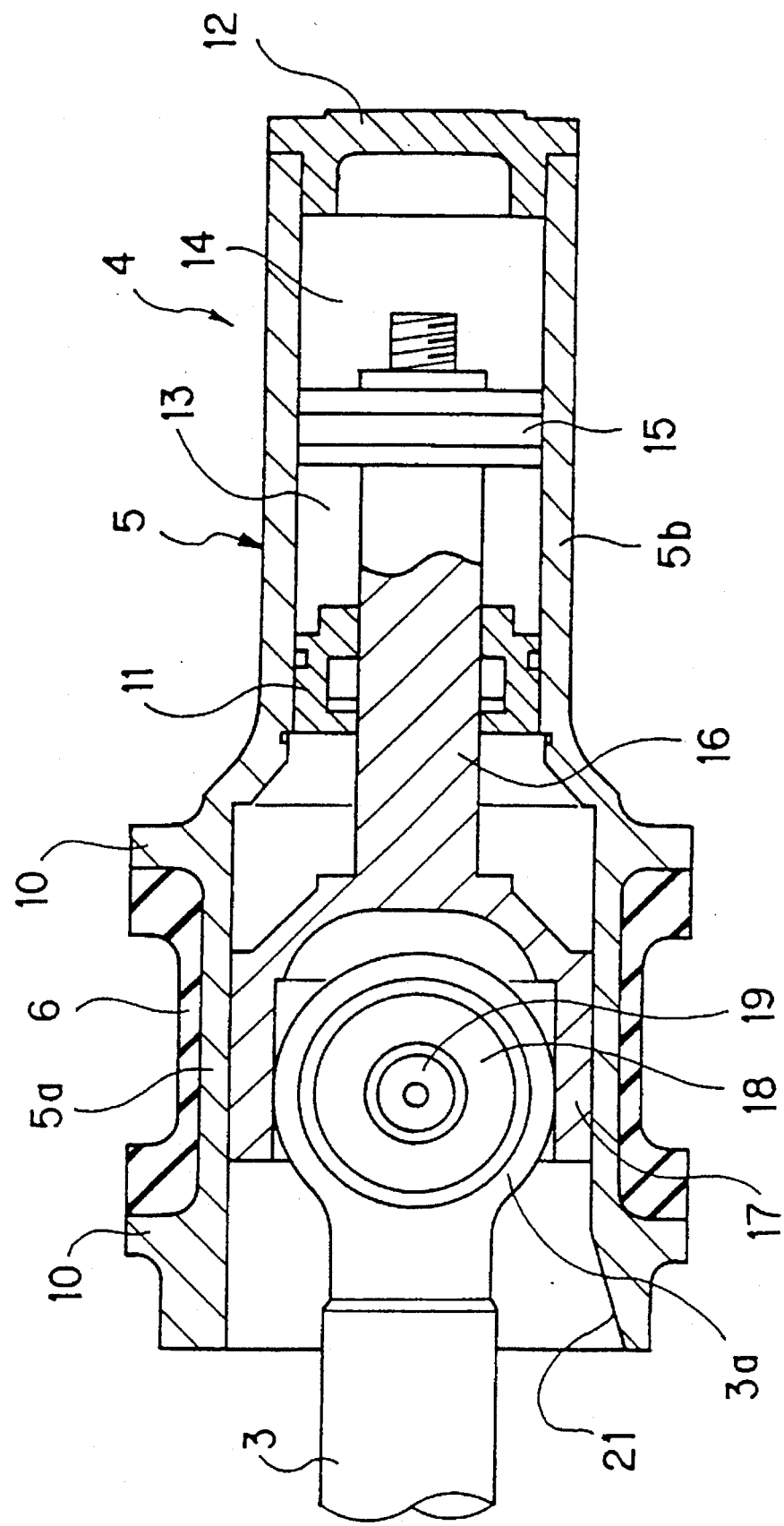
FIG. 2 is a schematic side cross sectional view showing an embodiment of the present invention.
Figure 3:
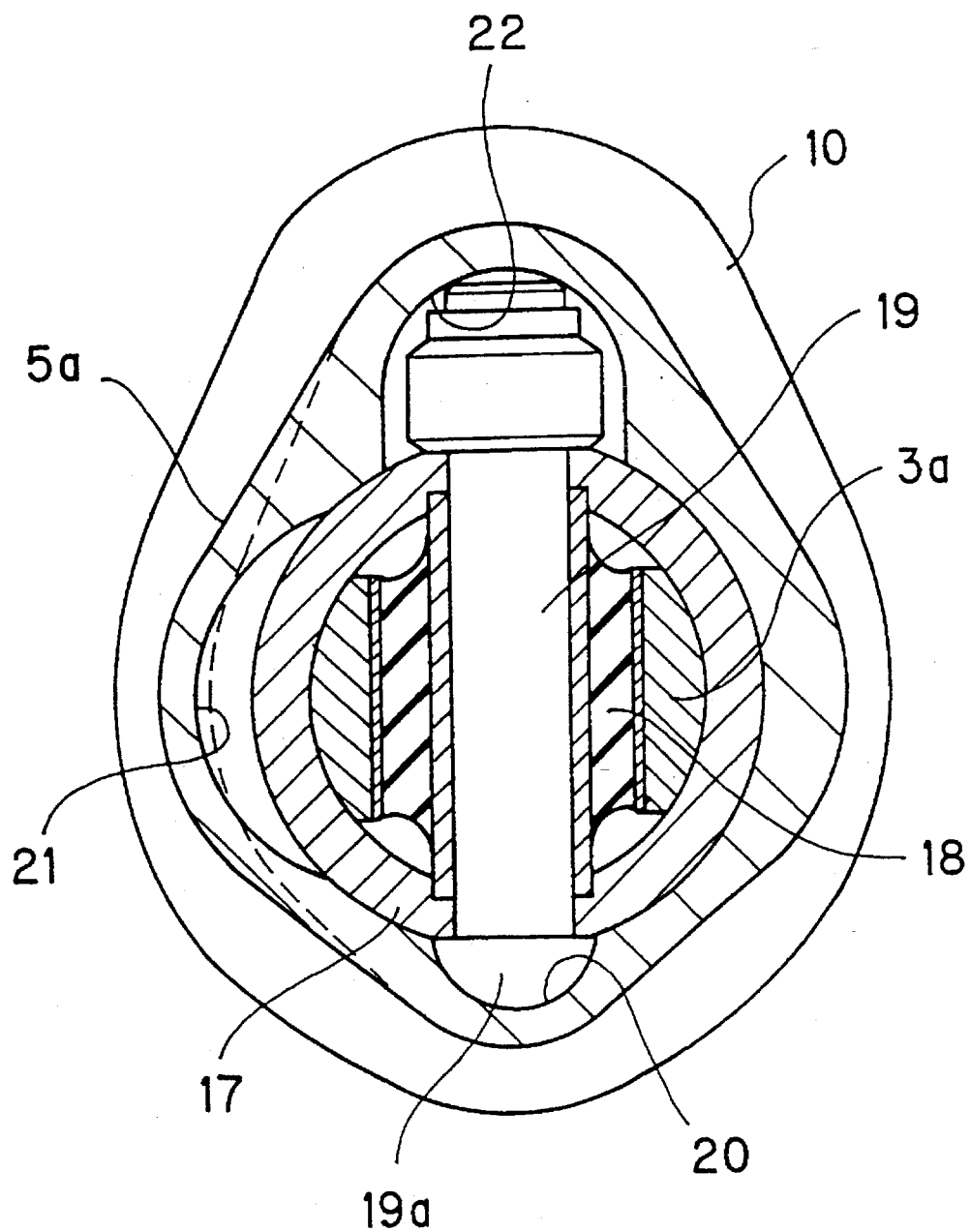
FIG. 3 is a schematic cross sectional view taken along line III—III in FIG. 1.

In the actuator 4, as shown in FIGS. 1 to 3, the body 5 comprises a large-diameter arm support unit 5a and a small-diameter cylinder unit 5b connected with each other, and is mounted to the sub-frame 7b of the vehicle body member with the bracket 7a and bolts.

The flange 10 is substantially perpendicular to an axial line of an operation rod 16 which will be described later, and a flange opposing the flange 10 is provided on the sub-frame 7b of the vehicle body member.

The cylinder unit 5b slidably contains a piston 15 which divides a space between a division wall 11 and an end cap 12 into a first hydraulic chamber 13 and a second hydraulic chamber 14, and a tip of the operation rod integrally reciprocating with the piston 15 slidably penetrates the division wall 11 and projects into the arm support unit 5a.

The first hydraulic chamber 13 and the second hydraulic chamber 14 are individually provided with a first port 13a and a second port 14a for supplying and discharging hydraulic pressure. The piston 15 is moved by supplying and discharging hydraulic pressure through the individual ports. Specifically, hydraulic pressure is supplied to the first hydraulic chamber and discharged from the second hydraulic chamber to move the piston 15 to the second hydraulic chamber side, and hydraulic pressure is supplied to the second hydraulic chamber and discharged from the first hydraulic chamber to move the piston 15 to the first hydraulic chamber side. Supply and discharge of the hydraulic pressure is controlled by a controller (not shown).

A cylindrical connection unit 17 is integrally formed at a tip of the operation rod, and a ring-formed mounting part 3a of the compression lower arm 3 is connected to be rotatable in the rotation direction of the compression arm 3 by a bolt 19 through a rubber bushing 18, and pivotably in a direction deviated from the rotation direction. The pair of flanges 10 are provided so that the rubber mount 6 can be disposed on the outer peripheral surface of the arm support unit 5a corresponding to a position of the connection unit 17 when the piston 15 is in a neutral position in the cylinder unit 5b.

The connection unit 17 is slidably supported on the inner peripheral surface of the arm support unit 5a, prevented from rotation about the longitudinal axis thereof by engagement of a hemispherically-formed bolt head 19a with a semicircular-sectioned guide groove 20 formed on the inner peripheral surface of the arm support unit 5a. In FIGS. 2 and 3, the reference numeral 21 indicates a relief on the inner peripheral surface of the arm support unit 5a when the compression arm 3 swings, and the reference numeral 22 is also a relief for a tip of the bolt 19.

A mud-proof rubber boot 23 is provided between a front opening of the arm support unit 5a and the outer peripheral surface of the compression lower arm 3, the cylinder unit 5b incorporates a sensor unit of a stroke sensor 24 for detecting a dislocation of the operation rod 16, and a tip of a sensor rod 24a engages with the connection unit 17.

With the above arrangement, when hydraulic pressure is supplied and discharged by a controller (not shown) to and from the first hydraulic chamber and the second hydraulic chamber, the operation rod 16 reciprocates to change the position of a mounting point (mounting part 3a) of the compression lower arm 3 at the vehicle body member side. This relatively varies the mounting point of the compression lower arm 3 at the knuckle 2 side and, hence, varies the caster angle.

In this case, it may be considered that, since the intermediate portion of the compression lower arm 3 itself is not an actuator, the arm length of the compression lower arm 3 does not change, but the vehicle body member side mounting point (mounting part 3a) moves. Further, the vehicle body member side mounting point (mounting part 3a) is swingable due to the rubber bushing 18. Therefore, the geometrical change due to suspension stroke is not affected even when the caster angle is adjusted.

Further, since the body 5 of the actuator 4 is mounted to the vehicle body side through the rubber mount 6, vibrations of the actuator 4 due to the swinging of the compression lower arm 3 are efficiently reduced, and the unsprung weight can be reduced.

We claim:

1. An alignment control actuator mounted on a suspension apparatus of a vehicle for controlling alignment of the suspension apparatus comprising:
   an operation rod having at an end thereof a connection unit for swingably connecting a vehicle body side end of a suspension arm;
   an actuator body slidably receiving said operation rod for selectively sliding said connection unit along a longitudinal direction of said operation rod; and
   a first elastic member mounted on an outer periphery of said actuator body at a position corresponding to a neutral position of said connection unit for connecting a vehicle body member and said actuator body.

2. The alignment control actuator of claim 1, wherein said operation rod has a piston, and said actuator body has a cylinder unit divided by said piston into two hydraulic chambers.

3. The alignment control actuator of claim 2, wherein said actuator body has a hollow-structured arm support unit at a suspension arm side of said cylinder unit, and said connection unit is slidably supported in said hollow-structured arm support unit for sliding said connection unit in a longitudinal direction of said suspension arm.

4. The alignment control actuator of claim 3, wherein said hollow-structured arm support unit has an inner diameter greater than an inner diameter of said cylinder unit.

5. The alignment control actuator of claim 3, further comprising a rubber boot closing an open ended side of said hollow-structured arm support unit.

6. The alignment control actuator of claim 1, wherein said actuator body provided with said first elastic member has a non-circular cross section.

7. The alignment control actuator of claim 1, wherein said actuator body has on its outer periphery a pair of contact surfaces opposing each other substantially perpendicular to an axial line of said operation rod;
   said vehicle body member has a pair of contact surfaces individually opposing the pair of contact surfaces of said actuator body; and
   said first elastic member has portions disposed individually between the pair of contact surfaces of said actuator body and the pair of contact surfaces of said vehicle body member.

8. The alignment control actuator of claim 1, wherein said connection unit has a shaft having an axial line substantially perpendicular to a longitudinal axial line of said suspension arm; and
   a second elastic member rotatably provided on said shaft for elastically connecting one end of said suspension arm with said operation rod.

9. The alignment control actuator of claim 8, wherein said actuator body has a support unit at a suspension arm side of a cylinder unit for sliding said connection unit in the longitudinal direction of said operation rod, said support unit further comprising a guide groove engaging with an end of said shaft to prevent rotation of said operation rod.

10. The alignment control actuator of claim 1, further comprising a stroke sensor for generating a signal corresponding to a position of said operation rod in relation to said actuator body.

11. An alignment control actuator mounted on a suspension apparatus of a vehicle for controlling alignment of the suspension apparatus comprising:
   an operation rod having at one end thereof a connection unit for pivotably connecting a vehicle body side end of a suspension arm and a piston unit at the other end thereof;
   an actuator body having a cylinder unit divided by said piston unit into two hydraulic chambers, and a hollow-structured arm support unit disposed at a suspension arm side of said cylinder unit for supporting said connection unit on an inner peripheral surface, and for selectively sliding said connection unit along a longitudinal direction of said operation rod; and
   a first elastic member mounted on an outer periphery of said actuator body at a position corresponding to a neutral position of said connection unit;
   wherein said actuator body is connected to a vehicle body member through said first elastic member.

12. The alignment control actuator of claim 11, wherein said cylinder unit has first and second ports individually communicating with said hydraulic chambers.

13. An alignment control actuator of a suspension apparatus having a suspension lower arm connected at an end thereof to a knuckle, said knuckle rotatably supporting a vehicle wheel, through a ball joint for receiving a longitudinal force of a vehicle body input to the vehicle wheel, comprising:

an operation rod having a connection unit for connecting the other end of said suspension lower arm allowing pivotal movement of said suspension arm in relation to said operation rod;

an actuator body receiving said operation rod for selectively sliding said connection unit in a longitudinal direction of said operation rod; and a first elastic member mounted on an outer periphery of said actuator body at a position corresponding to a neutral position of said connection unit for connecting a vehicle body member and said actuator body.

14. An alignment control method for a suspension apparatus having a suspension arm connected at one end thereof to a knuckle, said knuckle rotatably supporting a vehicle wheel, through a ball joint for receiving a longitudinal force of a vehicle body input to the vehicle wheel comprising the steps of:

connecting a connection unit formed at one end of an operation rod to the other end of said suspension arm;

slidably receiving said operation rod in an actuator body; and mounting said actuator body to the vehicle body through an elastic member mounted on an outer periphery of said actuator body at a position corresponding to a neutral position of said connection unit.

15. The alignment control method of claim 14, further comprising the steps of:

selectively moving said operation rod and suspension arm by controlling a fluid pressure applied to a pressure chamber formed by a cylinder formed in said actuator body and a piston formed at the other end of said operation rod.

* * * * *